(12) United States Patent
Viviroli (10) Patent No.: US 10,965,080 B2
(45) Date of Patent: Mar. 30, 2021

(54) CABLE END HOLDING DEVICE FOR HOLDING A CABLE END OF A CABLE, METHOD FOR POSITIONING A CABLE END OF A CABLE, AND CABLE ASSEMBLY MACHINE FOR ASSEMBLING A CABLE

(71) Applicant: KOMAX HOLDING AG, Dierikon (CH)

(72) Inventor: Stefan Viviroli, Horw (CH)

(73) Assignee: KOMAX HOLDING AG, Dierikon (CH)

(*) Notice: Subject to any disclaimer, the term of this patent is extended or adjusted under 35 U.S.C. 154(b) by 0 days.

(21) Appl. No.: 16/372,500

(22) Filed: Apr. 2, 2019

(65) Prior Publication Data

US 2019/0334306 A1  Oct. 31, 2019

(30) Foreign Application Priority Data

Apr. 26, 2018 (EP) .................................... 18169531

(51) Int. Cl.
*H01R 43/05* (2006.01)
*H01R 43/052* (2006.01)
(Continued)

(52) U.S. Cl.
CPC .......... *H01R 43/052* (2013.01); *B25J 9/1065* (2013.01); *H01R 43/05* (2013.01); *H01R 43/058* (2013.01); *H02G 1/1256* (2013.01); *H02G 1/14* (2013.01); *H01R 43/28* (2013.01); *Y10T 29/49192* (2015.01); *Y10T 29/514* (2015.01); *Y10T 29/5142* (2015.01);
(Continued)

(58) Field of Classification Search
CPC ............ Y10T 29/514; Y10T 29/53235; H01R 43/0488; H01R 43/052; B25J 9/1065; B25J 9/0045
USPC ...................... 29/564.4, 753, 33 M; 414/917
See application file for complete search history.

(56) References Cited

U.S. PATENT DOCUMENTS 3,262,593 A * 7/1966 Hainer ..................... B25J 18/02
414/619
4,548,544 A * 10/1985 Van Appledorn ........ B21J 13/10
198/750.11
(Continued)

FOREIGN PATENT DOCUMENTS

CN         103433918 A  * 12/2013
CN         106003002 A  * 10/2016
(Continued)

*Primary Examiner* — Erica E Cadugan
(74) *Attorney, Agent, or Firm* — William J. Clemens; Shumaker, Loop & Kendrick, LLP (57) ABSTRACT

A cable end holding device for holding a cable end of a cable for a crimp process includes a cable holding element for holding the cable end and a vertical position alteration device having two lever elements for altering the vertical position of the cable holding element in a manner decoupled from a movement of a stamp during the crimp process. The lever elements extend mutually parallel along a longitudinal direction of the lever elements and are arranged mutually offset in height and in a width direction perpendicular to the vertical and perpendicular to the longitudinal direction. The lever elements each are rotatably mounted about a first axis of rotation extending along the width direction, the two first axes of rotation extending mutually parallel.

15 Claims, 10 Drawing Sheets

(51) Int. Cl.
*H02G 1/12* (2006.01)
*H02G 1/14* (2006.01)
*B25J 9/00* (2006.01)
*H01R 43/058* (2006.01)
*B25J 9/10* (2006.01)
*H01R 43/28* (2006.01)

(52) U.S. Cl.
CPC ...... *Y10T 29/5193* (2015.01); *Y10T 29/53235* (2015.01); *Y10T 29/53261* (2015.01)

(56) References Cited

U.S. PATENT DOCUMENTS

| | | | | |
|---|---|---|---|---|
| 5,027,487 A * | 7/1991 | Parker | ............... | H01R 43/04 |
| | | | | 29/33 M |
| 5,235,735 A * | 8/1993 | Koch | ............... | H02G 1/1256 |
| | | | | 29/564.4 |
| 5,247,732 A * | 9/1993 | Lait | ............... | H01R 43/28 |
| | | | | 219/121.68 |
| 6,230,386 B1 * | 5/2001 | Hasegawa | ............... | H01R 43/05 |
| | | | | 29/33 M |
| 6,279,215 B1 * | 8/2001 | Nomoto | ............... | H01R 43/052 |
| | | | | 29/33 M |
| 7,251,876 B2 * | 8/2007 | Rodriguez | ............... | H01R 43/28 |
| | | | | 29/33 M |
| 7,363,693 B2 * | 4/2008 | Fischer | ............... | H01R 43/28 |
| | | | | 29/564.4 |
| 7,490,400 B2 * | 2/2009 | Zurkirchen | ............... | H01R 43/28 |
| | | | | 29/33 F |
| 7,603,768 B2 * | 10/2009 | Viviroli | ............... | H01R 43/0488 |
| | | | | 29/33 M |
| 7,637,005 B2 * | 12/2009 | Lustenberger | ............... | H01R 43/048 |
| | | | | 29/33 F |
| 7,698,801 B2 * | 4/2010 | Conte | ............... | H01R 43/0486 |
| | | | | 29/564.4 |
| 2014/0245601 A1 * | 9/2014 | Viviroli | ............... | H01R 43/052 |
| | | | | 29/753 |
| 2015/0311659 A1 * | 10/2015 | Fries | ............... | H01R 43/05 |
| | | | | 29/863 |
| 2016/0139590 A1 * | 5/2016 | Agustoni | ............... | B25J 9/1602 |
| | | | | 700/122 |

FOREIGN PATENT DOCUMENTS

| | | |
|---|---|---|
| EP | 0994538 A2 | 4/2000 |
| EP | 2775573 A1 | 9/2014 |
| EP | 2937953 B1 | 6/2017 |
| WO | 2011004272 A1 | 1/2011 |

* cited by examiner

28 VERTICAL POSITION ALTERATION DEVICE INCLUDING AN ECCENTRIC TAPPET

Fig. 10 PRIOR ART

CABLE END HOLDING DEVICE FOR HOLDING A CABLE END OF A CABLE, METHOD FOR POSITIONING A CABLE END OF A CABLE, AND CABLE ASSEMBLY MACHINE FOR ASSEMBLING A CABLE

FIELD

The present invention relates to a cable end holding device for holding a cable end of a cable, to a method for positioning a cable end of a cable, and to a cable assembly machine for assembling a cable.

BACKGROUND

Figure 10:
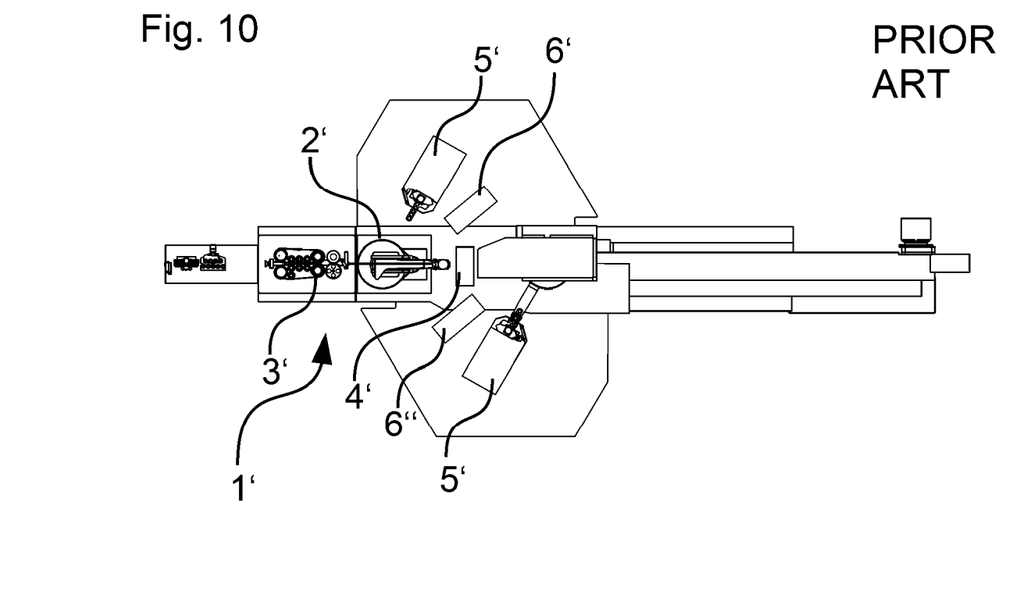
FIG. 10 is a plan view of a known cable assembly machine.
Figure 11:
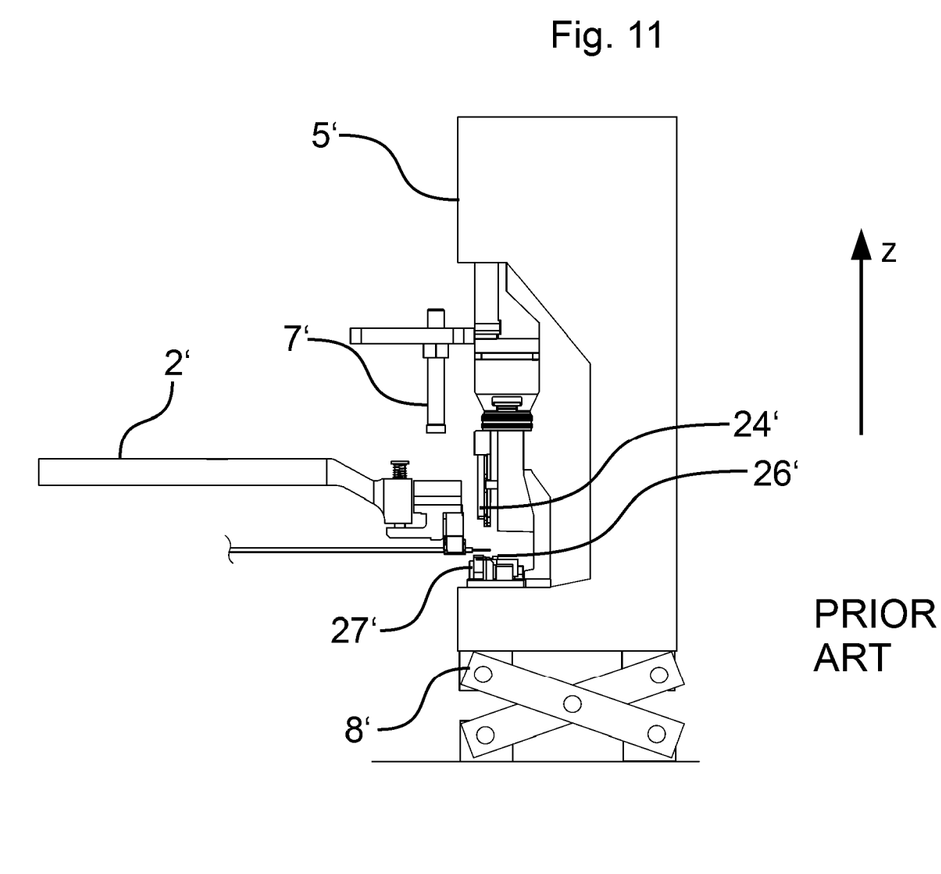
FIG. 11 is a side view of the known cable assembly machine of FIG. 10.

A large number of cable assembly machines or cable end holding devices for holding a cable end of a cable are known. FIG. 10 is a plan view and FIG. 11 is a side view of a known cable assembly machine having a press 5' or crimp press comprising an anvil 27' and a stamp 24' for connecting a contact element 26' to a cable end or comprising a cable end holding device according to the prior art. The cable assembly machine comprises two additional stations 6', 6" at which the cable or the cable end can be further modified.

Cable assembly machines having pivot arms, such as are known for example from EP 2 937 953 B1, comprise a cable end holding device 1' for holding a cable end of a cable. In this context, the cable end is held by vertically movable gripping heads or holding elements so as to position the cable end in the correct vertical position with respect to the press tool. These gripping heads or holding elements are mounted resiliently and are lowered synchronously with the press by way of a plunger 7' on the contact press. The cable is supplied by a cable guide 3'. The processing sequence starts with cutting the cable in the blade block 4'.

The cable end, the cable tip, is also stripped over a predetermined length while in the blade block 4'. In this context, stripping blades are closed sufficiently that the insulation is sufficiently cut but the metal conductor of the cable or of the cable end is not damaged. By means of a hoist drive, which acts in the direction of the cable axis, the pivot arm 2' having the gripper is pulled away from the stripping blade. The occurring forces can sometimes be 400 N, and in the prior art this was absorbed by reinforcements in the gripper receiver or in the holding element, but this leads to a high mass inertia of the pivot arm 2' or of the cable end holding device.

After the stripping, the cable end is pivoted toward the press 5'. The pivot arm 2' has a pivot drive for this purpose. Since the cable end or cable tip and the gripper or holding element do not have any drive of their own for the movement in the Z direction (the vertical direction), a clear corridor is created through which the cable end or the cable tip can be turned or pivoted into the operating positions. This movement extends horizontally between the stamp and the protruding parts of the contact on the anvil. Usually, the calibration is performed in such a way that the cable end is closer to the protruding parts of the contact than to the stamp.

A large number of different pressing tools are known, which differ among other things in the height of the anvil. Likewise, the length of the protruding parts of the contacts may differ from product to product. Depending on which pressing tool and which contact are used, in the event of a change of product the height of the processing stations needs to be reset by way of a height adjustment system 8', so as to ensure the clear corridor. When the product is set up, the plunger 7' is set in such a way that it contacts the gripper or holding element that holds the cable end as soon as the stamp reaches the desired distance from the cable end. Since this is carried out manually afresh for each product, this setting is a known source of error.

At the start of the pressing process, the cable end or the cable tip is located between the stamp and the protruding parts of the contact. The press 5' now moves the stamp and the plunger in the negative Z direction (in other words downward in the vertical direction) toward the cable end or the cable tip. The flanks of the stamp enclose the cable end or the cable tip. Once the set distance between the stamp and the cable end is reached, the press 5' moves the stamp and, via the plunger 7', the gripper or holding element having the cable end toward the anvil and the contact in the negative Z direction. In its continuing progression, the cable end comes to be positioned in the dip in the contact part, during which the protruding parts of the contact are deformed by the stamp. Since the plunger 7' can be set only for a relative distance between the stamp and the cable end, the cable is located below the position of the contact when the stamp reaches the end position thereof. The cable is thus overcompressed or bent. In cables, in particular cables of relatively small cross section, this overcompression carries the risk of the cable end being pulled out of the connection. After the pressing is complete, the pressing tool is opened and the cable end is pivoted back. Once the desired length of the cable has been supplied, the blades in the blade block 4' cut the cable. The rear end of the cable that has been cut to size is likewise processed as described above, a second pivot arm means or cable end holding device and a second press being present on the opposite side of the blade block 4'.

Thus, in each case the anvil has to be adapted to the vertical position at which the cable end or cable tip is located. In addition, in the prior art, the tools in each case have to be set to a height such that a clear corridor occurs at the same height when the gripper or cable holding element turns.

SUMMARY

Among other things, there may be a need for a cable end holding device for holding a cable end or for a method for positioning a cable end of a cable by way of which the cable end or cable tip can be positioned at different heights in a technically simple manner.

This need can be met by a cable end holding device or by a cable assembly machine for assembling a cable or by a method for positioning a cable end of a cable according to advantageous embodiments of the invention described below.

A first aspect of the invention proposes a cable end holding device for holding a cable end of a cable for a crimp process, the cable end holding device comprising the following: a cable holding element for holding the cable end and a vertical position alteration device having two lever elements for altering the vertical position of the cable holding element in a manner decoupled from a movement of a stamp during the crimp process, the lever elements being arranged extending mutually parallel along a longitudinal direction of the lever elements, the lever elements being arranged mutually offset in height and in a width direction perpendicular to the vertical and perpendicular to the longitudinal direction, and the lever elements each being rotatably mounted about a first axis of rotation extending along the width direction, the two first axes of rotation extending mutually parallel.

An advantage of this is that the cable holding element can usually be held or positioned in different vertical positions in a technically simple manner. Thus, the vertical position of the cable holding element and thus of the cable end can generally be adapted to the instrument in question in a technically simple manner. A vertical alteration to the tools is thus generally not necessary. This typically reduces the time for the setup operations considerably. Further, the cable holding element and thus the cable end are generally held firmly and securely at the vertical position in question. By way of the lever elements, which extend mutually offset and mutually parallel, the vertical position of the cable holding element or cable end can generally be altered in a technically particularly simple manner, and the altered vertical position can be maintained in a particularly secure and rigid manner. In the case of a press as a tool, it is typically possible in particular to dispense with a plunger or a rigid connection between the press and the cable end holding device. In addition, overcompression of the cable end during pressing can in general be reliably prevented.

A second aspect of the invention proposes a method for positioning a cable end of a cable using a cable end holding device for a crimp process, the cable end holding device having a vertical position alteration device for altering the vertical position of a cable holding element, the vertical position alteration device having two lever elements extending mutually parallel along the longitudinal direction thereof, and the lever elements each being rotatably mounted about a first axis of rotation extending along a width direction, the width direction being perpendicular to the vertical and perpendicular to the longitudinal direction, the method comprising the following steps: holding the cable end using the cable holding element; and altering the vertical position of the cable end in a manner decoupled from a movement of a stamp during the crimp process in that the lever elements are each rotated about the first axis of rotation thereof.

This is advantageous in that the cable end can typically be held or positioned in different vertical positions in a technically simple manner. The vertical position of the cable end or cable tip can thus generally be adapted to the instrument or tool in question in a technically simple manner. A vertical alteration of the tools is therefore generally not necessary. This typically greatly reduces the time for processing the cable end or cable tip. Further, the cable end is generally held firmly and securely in the vertical position in question. By way of the lever elements, which extend mutually offset and mutually parallel, the vertical position of the cable end can generally be altered in a technically particularly simple manner, and the altered vertical position can be maintained in a particularly secure and rigid manner. By way of this method, in the case of a press as a tool, it is typically possible in particular to dispense with a plunger or a rigid connection between the press and the cable end holding device. In addition, overcompression of the cable end during pressing can generally be reliably prevented with this method.

The two first axes of rotation of the lever elements extend mutually offset in height and in the longitudinal direction.

Possible features and advantages of embodiments of the invention may, among other things and without limiting the invention, be considered to be based on ideas and findings described hereinafter.

In one embodiment of the cable end holding device, the cable end holding device further comprises a longitudinal position alteration device for altering the position of the cable holding element along the longitudinal direction. As a result, in general the vertical position of the cable holding element can be set or altered without the position of the cable holding element in the longitudinal direction being altered. This means that the cable holding element or the cable end held by the cable holding element can be moved in the negative Z direction, in other words vertically downward, without a movement of the cable holding element in a longitudinal direction extending perpendicular to the Z direction generally taking place. Thus, the cable end or cable tip can typically be positioned even more precisely. Further, it can generally be ensured that, in the case of a press as a tool, the cable end does not move in the longitudinal direction relative to the stamp while the cable end is being moved downward.

In one embodiment of the cable end holding device, the cable end holding device further comprises a rotation device for rotating the cable holding element and the lever elements about an axis of rotation extending along the vertical. As a result, various processing stations or tools on which the cable or cable end is processed can typically be approached rapidly in a technically simple manner. In particular, in general even processing stations or tools for which the cable end has to be in different vertical positions can be approached. Also, it is typically possible to lower and/or raise the position of the cable end or cable tip along the vertical direction during the rotational movement so as to avoid obstacles or parts of processing stations during the rotation. Thus, in general, no clear corridor has to be set up at the same height during the rotation of the gripper or cable holding element. A type of ascent and descent of the cable holding element can be brought about during the rotation so as to prevent collisions of the cable holding element with parts of tools.

In one embodiment of the cable end holding device, the vertical position alteration device has a curved disk, in particular an arithmetic spiral, and/or an eccentric tappet for changing the vertical position of the cable holding element. As a result, the vertical position of the holding element can generally be altered in a technically particularly simple manner. Further, the vertical position alteration device typically has particularly low wear. In addition, the vertical position of the holding element can generally be set particularly exactly.

In one embodiment of the cable end holding device, the cable holding element has a vertical position setting device for altering the vertical position of the cable end. An advantage of this is that, while the lever elements are or remain oriented horizontally, the vertical position of the cable end is still alterable. In this way, forces that act horizontally, for example when the cable end is stripped, can typically be absorbed particularly well by the lever elements, since these can always be oriented horizontally in spite of different vertical positions of the cable end.

In one embodiment of the method, a change in the position of the cable end in the longitudinal direction as a result of a change in the vertical position of the cable end can be compensated by a longitudinal position alteration device in such a way that the position of the cable end in the longitudinal direction substantially does not change. By this method, the vertical position of the cable end can be set or altered without the position of the cable end generally being altered in the longitudinal direction. This means that the cable end or cable tip can be moved in the negative Z direction, in other words vertically, without the cable end moving in a longitudinal direction extending perpendicular to the Z direction. Thus, the cable end or cable tip can typically be positioned even more exactly. Further, it can in general be ensured that, in the case of a press as a tool, the cable end does not move in the longitudinal direction relative to the stamp while the cable end is being moved downward.

In one embodiment of the method, a distance of the cable end from a contact element arranged on an anvil of a press is reduced by the vertical position alteration device for a given time period, synchronously with a distance of a stamp of the press from the contact element. As a result, the cable end is typically moved toward a contact element together or simultaneously with the stamp in a technically simple manner.

In one embodiment of the method, before the cable end strikes the contact element, the movement speed of the cable end relative to the contact element is reduced, in such a way that the cable end contacts the contact element at a reduced speed. Braking the cable end before the contact element is reached or touched generally prevents large forces from occurring along the movement direction of the cable end, in other words in the Z direction, when the cable end strikes the contact element. As a result, unintended bending or overcompression of the cable end or cable is in general reliably prevented.

In one embodiment of the method, the method further comprises the following steps: rotating the cable end about an axis of rotation extending along the vertical, in such a way that the cable end points toward a cutting device; holding in place a part to be removed of the cable end, in particular insulation of the cable end, using the cutting device; and moving away the cable end along the longitudinal direction, in such a way that the part to be removed is held in place by the cutting device and cut off from the cable end. As a result, a part of the cable end or cable is typically stripped in a technically particularly simple manner.

In one embodiment of the method, the method further comprises the following step: altering the vertical position of the cable end using a vertical position setting device of the cable holding element. An advantage of this method is that, while the lever elements are or remain oriented horizontally, the vertical position of the cable end is still altered. In this way, forces that act horizontally, for example when the cable end is stripped, can typically be absorbed particularly well by the lever elements, since these can always be oriented horizontally in spite of different vertical positions of the cable end.

The movement of the cable end or cable holding element is decoupled from or independent of the movement of the stamp of the crimp press, or is decoupled or independent during the crimp process. For the movement of the cable end or cable holding end, the cable end holding device is configured to be independent of or decoupled from a movement of a part of the crimp press (such as a stamp, an anvil or the like). No mechanical connection or mechanical contact need be present between the crimp press and the cable holding element or cable end holding device; in other words, it is possible for no mechanical connection to be present. The height (in other words the distance in the vertical direction, which usually corresponds to the movement direction of the stamp) of the cable end or cable holding element with respect to the stamp and the anvil or crimp press can be altered in a manner independent of or decoupled from a movement of a part of the crimp press (in particular without a mechanical connection to a stamp and/or plunger of the crimp press). A motor can alter the height of the cable holding element relative to the crimp press without the motor moving a part of the crimp press. The cable end holding device may have its own drive.

The cable end holding device and the crimp press may be two mutually mechanically separated elements. As a result, the cable end or the cable holding element can be moved toward the anvil and/or the stamp or away from the anvil and/or the stamp, without a part of the crimp press, in particular the stamp or a plunger, moving. The speed of the movement of the cable holding element or cable end can be completely independent of the speed of the movement of a stamp and/or plunger during the crimp process or of the crimp press.

In addition, the cable end holding device may be designed to alter the longitudinal position of the cable holding element or cable end along a longitudinal direction extending perpendicular to the vertical direction or perpendicular to the vertical. This movement of the cable holding element or cable end can be decoupled from or independent of a movement of a part of the crimp press, in particular independent of a movement of a stamp or a plunger of the crimp press. The cable end or cable holding element can thus be moved toward and away from the crimp press or the anvil or the stamp of the crimp press independently of a movement of a part of the crimp press in the longitudinal direction.

As a result, a crimp press having a stamp, an anvil and the above-described cable end holding device is also disclosed. The crimp press may have one or more processing stations.

It is noted that some of the possible features and advantages of the invention are described herein with reference to different embodiments. A person skilled in the art will recognize that the features can be combined, adapted or exchanged in a suitable manner so as to arrive at further embodiments of the invention.

DESCRIPTION OF THE DRAWINGS

Hereinafter, embodiments of the invention are described with reference to the accompanying drawings, neither the drawings nor the description being intended to be interpreted as limiting the invention. In the drawings.

The drawings are merely schematic and not to scale. Like reference numerals denote like or functionally equivalent features in the various drawings.

DETAILED DESCRIPTION

Figure 1:
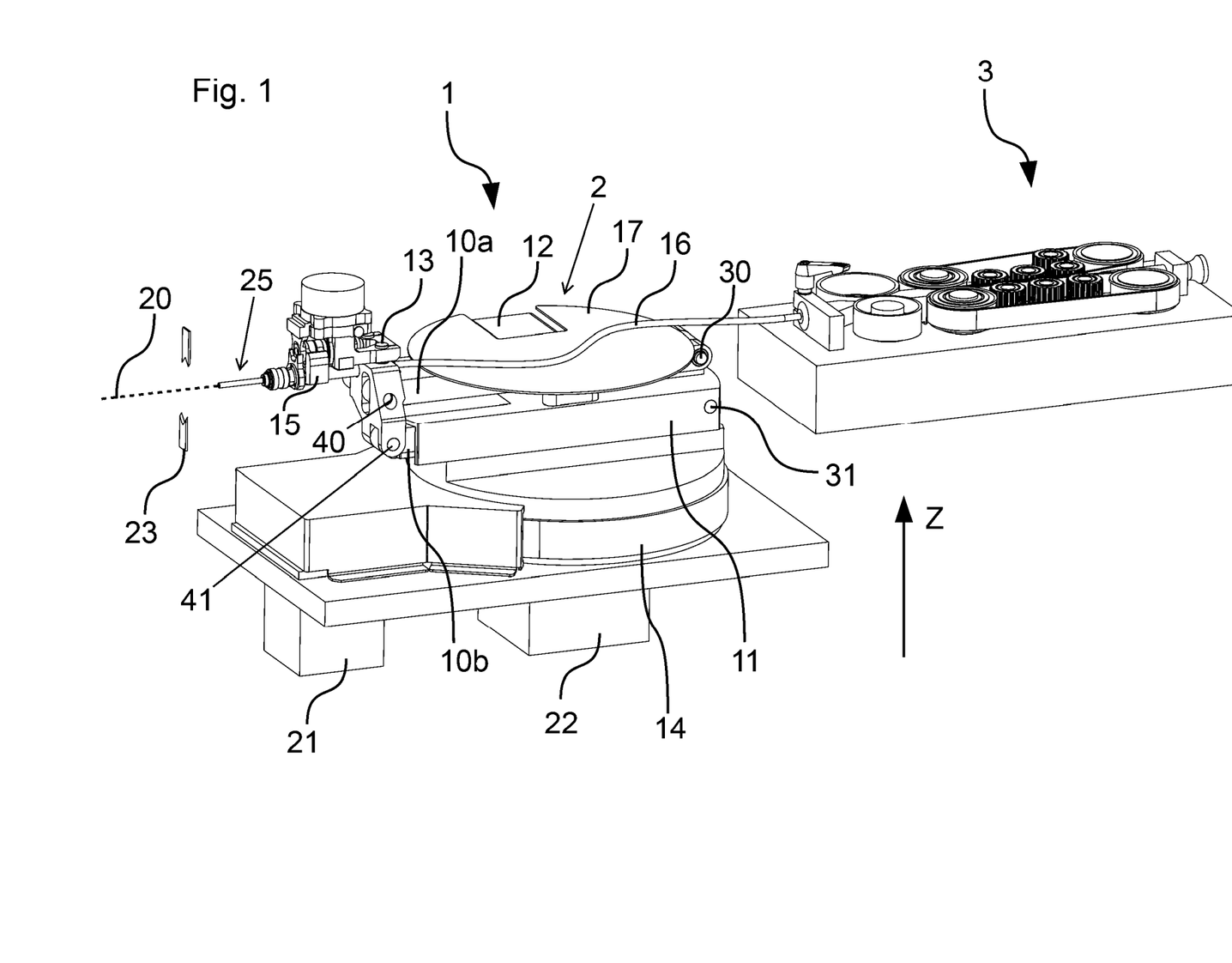
FIG. 1 is a perspective view of an embodiment of the cable end holding device according to the invention.

FIG. 1 is a perspective view of an embodiment of the cable end holding device 1 according to the invention.

Figure 2:
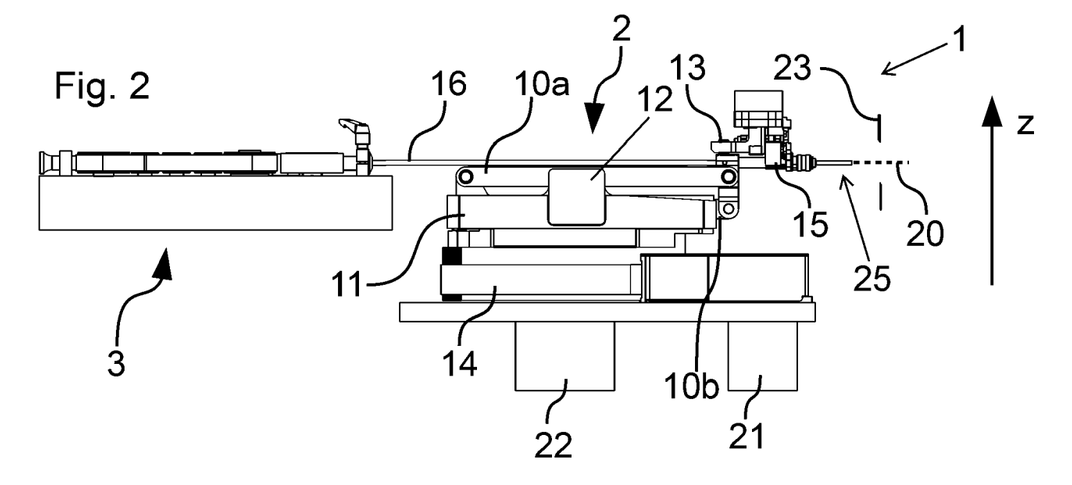
FIG. 2 is a side view of the cable end holding device of FIG. 1.

FIG. 2 is a side view of the cable end holding device 1 of FIG. 1.

Figure 3:
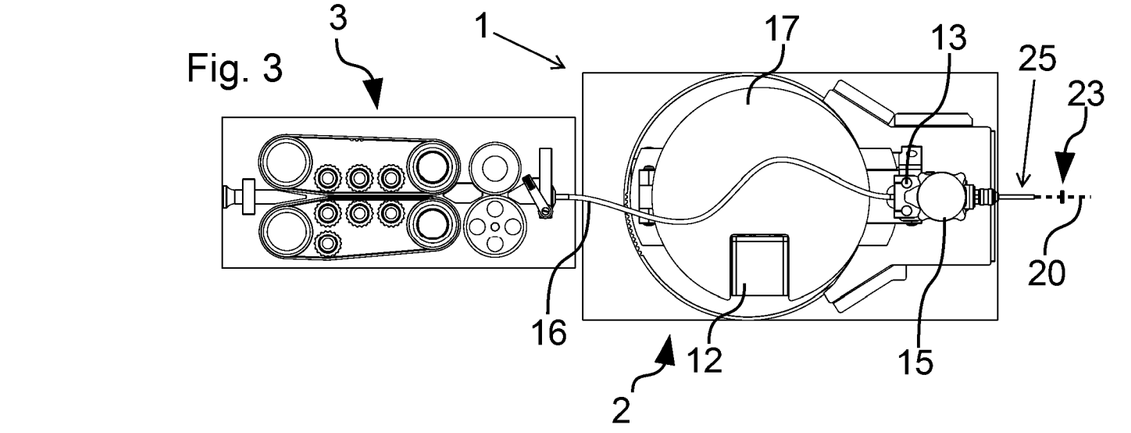
FIG. 3 is a plan view of the cable end holding device of FIG. 1 and FIG. 2.

FIG. 3 is a plan view of the cable end holding device 1 of FIG. 1 and FIG. 2.

The cable end holding device 1 has a pivot arm 2 and a cable holding element 15 for holding a cable end 25 or cable tip of a cable. The pivot arm 2 can rotate the cable holding element 15 about a vertical axis and alter it in a longitudinal direction (extending from left to right in FIG. 2) and in a vertical direction (extending from bottom to top in FIG. 2).

The cable holding element 15 holds the cable end 25 or the cable tip, in other words the end of a cable. The outermost tip or outermost end of the cable protrudes from the cable holding element 15 on a side of the cable holding element 15 remote from the pivot arm 2.

The cable end 25 or cable tip is normally not the outermost end of the cable. The cable end 25 or cable tip is a part of the cable located close to the outermost end of the cable. The outermost end of the cable may for example be spaced apart by for example approximately 0.5 cm to approximately 5 cm, in particular approximately 1 cm to approximately 3 cm, preferably approximately 1 cm to approximately 2 cm, from the part of the cable that is grasped or contained or enclosed in whole or in part by the cable holding element 15.

The cable end holding device 1 additionally comprises a vertical position alteration device for altering the vertical position of the cable holding element 15 and thus for altering the vertical position of the cable end 25 held by the cable holding element 15. A reduction in the vertical position of the cable holding element 15 means that the cable holding element 15 is moved closer to the ground or lowered. An increase in the vertical position of the cable holding element 15 means that the cable holding element 15 is removed further from the ground (moved in the positive Z direction).

The cable is fed to the cable end holding device 1 by a cable feed 3. The cable is arranged at least in part in a guide tube 16. The cable end is typically not arranged in the guide tube 16. The guide tube 16 is positioned in part on a plate-shaped disk or plate 17 of the cable end holding device 1 or is supported on the upper lever element 10a by the disk. The guide tube 16 usually does not extend on the disk or plate 17 in a straight line.

The cable holding element 15 is arranged on the side of the cable end holding device 1 remote from the cable feed 3. The cable holding element 15 is mounted on the pivot arm 2. The cable holding element 15 comprises a gripper, which grips and holds the cable end 25 or the cable. The cable holding element 15 is fixed to the lever elements 10a, 10b of the pivot arm 2.

The gripper or cable holding element 15 is mounted rotatably about a horizontally extending axis, in such a way that the cable end 25 always extends horizontally. The disk or plate 17 is placed on one of the lever elements 10a, 10b and changes the angular position thereof with respect to the cable holding element 15 as a function of the construction when the vertical position of the cable holding element 15 is changed.

A blade 23 or double blade for stripping the cable end 25 and/or for cutting the cable is shown on the left in FIG. 1.

The lever elements 10a, 10b are oriented in such a way that they extend horizontally. By means of the height setting device, the lever elements 10a, 10b and thus the cable holding element 15 are set to the desired or required height. The cable end 25 or cable tip is guided centrally between the two elements of the blade 23.

Thereupon, the blade 23 is closed sufficiently that the insulation of the cable end 25 is cut through but not the metal core/conductor of the cable itself. Subsequently, the cable end 25 is moved away from the blade 23 or blades again in a longitudinal direction, in such a way that the insulation remains at the blade 23 and is detached from the remaining cable or from the cable end 25.

The cable end holding device 1 comprises two lever elements 10a, 10b, also known as parallelogram lever elements. The two lever elements 10a, 10b are each mounted rotatably about a horizontally extending first axis of rotation 30, 31. The two first axes of rotation 30, 31 are located on the right side in FIG. 1. The two first axes of rotation 30, 31 extend mutually parallel and mutually vertically offset. In addition, the two lever elements 10a, 10b are each mounted rotatably about a horizontally extending second axis of rotation 40, 41. The two second axes of rotation 40, 41 are located on the left side in FIG. 1.

The two lever elements 10a, 10b extend mutually parallel. The lever elements 10a, 10b are arranged mutually offset in height (Z direction) and in a direction extending perpendicular to the vertical direction and perpendicular to the longitudinal direction of the two lever elements 10a, 10b (the longitudinal direction extending from left to right in FIG. 2 and in FIG. 3). This direction extends perpendicular to the plane of the drawing in FIG. 2. One lever element 10b is arranged further forward in FIG. 1 than the other lever element 10a.

One lever element 10b (the front lever element in FIG. 1) is arranged in a vertical position that has a lower height than the vertical position of the other lever element 10a (the rear lever element in FIG. 1). The two lever elements 10a, 10b form parts or the longitudinal sides of a parallelogram.

The upper part in FIG. 1 of the cable end holding device 1 comprising the lever elements 10a, 10b and the cable holding element 15 is rotatable about a vertically extending axis. For this purpose, the cable end holding device 1 has a rotation device 14 for rotating the lever elements 10a, 10b or the cable holding element 15. As a result, various processing stations or tools for processing the cable end 25 or cable tip can be approached. The rotation device 14 comprises a motor 21 for performing the rotational movement. The rotation device 14 can rotate the lever elements 10a, 10b about a vertically extending axis of rotation. The axis of rotation may in particular extend through the center of the disk or plate 17.

The cable axis 20 extends along the primary extension direction of the cable end 25 and in FIG. 1 parallel to the longitudinal direction of the lever elements 10a, 10b or lever.

FIG. 4a-4d are details of a cable end 25 during the process of connecting the cable end 25 to a contact element 26 using a press 5. The contact element 26 may for example be a crimp element. Initially, the cable end 25 is located closer to the contact element 26 than to the stamp 24 so as to prevent unnecessary movement of the cable end 25 (see FIG. 4a). Thereupon, the stamp 24 is moved toward the anvil 27 or the cable end 25, for example until the stamp 24 has as predetermined distance between the stamp 24 and the cable end 25 along the vertical direction (Z direction).

Figure 4A:
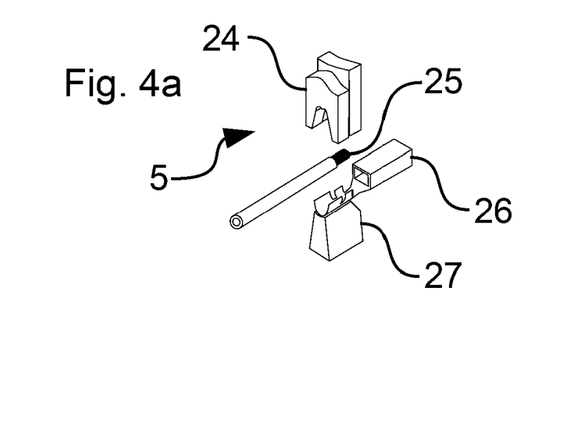
FIGS. 4a-4d are details of a cable end during the process of connection to the contact element.
Figure 4B:
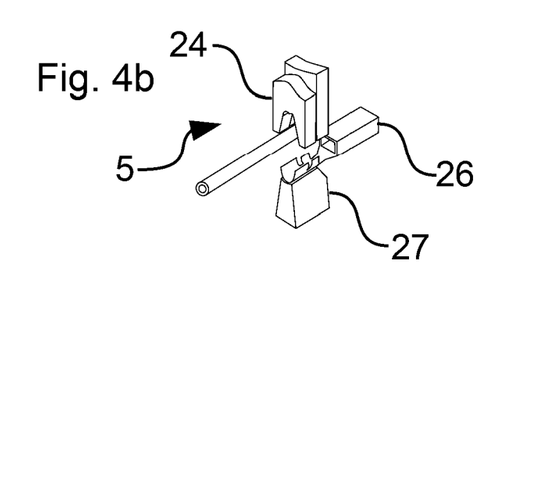

Now, the stamp 24 and the cable end 25 are jointly moved toward the anvil 27 synchronously, in other words at the same speed (see FIG. 4b). In this context, the vertical position (position along the Z direction) of the cable end 25 is altered by altering the angle of the lever elements 10a, 10b with respect to the horizontal in that the lever elements 10a, 10b are rotated about the first axes of rotation 30, 31 thereof.

Figure 4C:
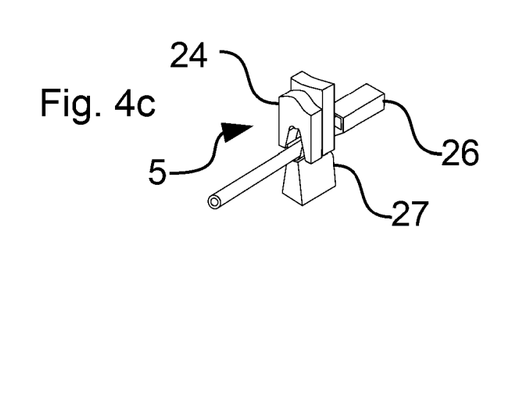

Between FIG. 4b and FIG. 4c, the cable end 25 is moved synchronously with the stamp 24 in the direction of the anvil 27. In FIG. 4b, the cable end 25 is accelerated to the speed of the stamp 24. Shortly before the situation shown in FIG. 4c, the cable end 25 is braked, in such a way that the cable end 25 does not collide with the contact element 26. After a predetermined time period, during which the cable end 25 moves synchronously with the stamp 24, the movement of the cable end 25 is decoupled from the movement of the stamp 24 in that the movement of the cable end 25 is reduced after the predetermined time period.

The alteration of the position of the cable end 25 along the longitudinal direction of the lever elements 10a, 10b or parallel to the horizontal as a result of the rotation of the lever elements 10a, 10b about the first axes of rotation 30, 31 is compensated by the longitudinal position alteration device 11. Thus, the lever elements 10a, 10b are moved along the longitudinal direction while the lever elements 10a, 10b are rotating about the first axes of rotation 30, 31 thereof.

In this context, when the lever elements 10a, 10b pass through the horizontal position thereof, a forward movement and subsequently a rearward movement or vice versa take place in the longitudinal direction, in such a way that the cable end 25 only moves along the vertical direction (Z direction).

Finally, the cable end 25 or cable tip touches the contact element 26 (see FIG. 4c). Shortly beforehand, in other words before the cable end 25 passes into a dip in the contact element 26, the speed of the movement of the cable end 25 toward the contact element 26 is reduced, in other words the cable end 25 is braked. As a result, the occurring forces when the cable end 25 strikes the contact element 26 are reduced. The cable end 25 is moved together with a part of the cable so as to prevent kinking or bending of the cable.

Figure 4D:
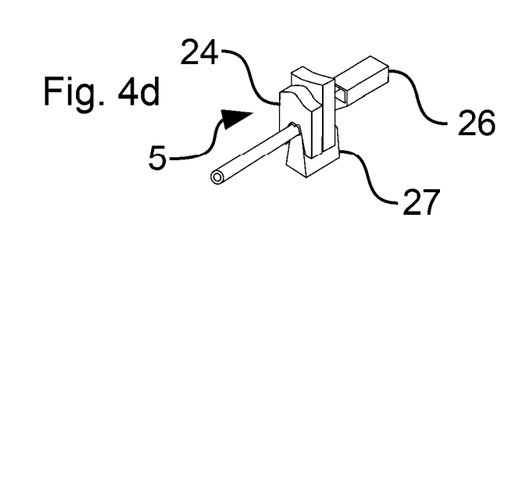

The stamp 24 pushes the cable end 25 or cable tip and the contact element 26 against the anvil 27, and thus pushes the cable end 25 against the contact element 26 (see FIG. 4d). The protruding parts of the contact element 26 are deformed by the stamp 24, and a connection is thus formed between the cable end 25 or cable and the contact element 26. Subsequently, the stamp 24 is removed from the anvil 27 again and releases the cable end 25 comprising the contact element 26 connected to the cable end 25.

Figure 5:
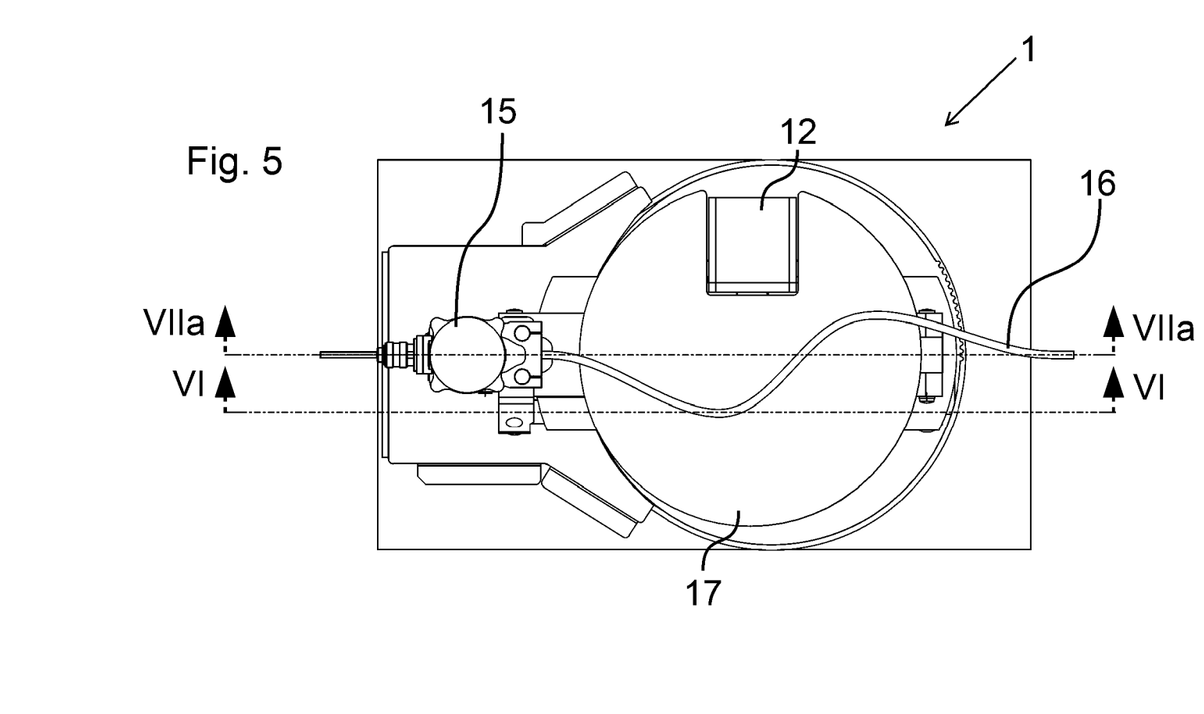
FIG. 5 is a plan view of a part of the cable end holding device of FIGS. 1-3.
Figure 6:
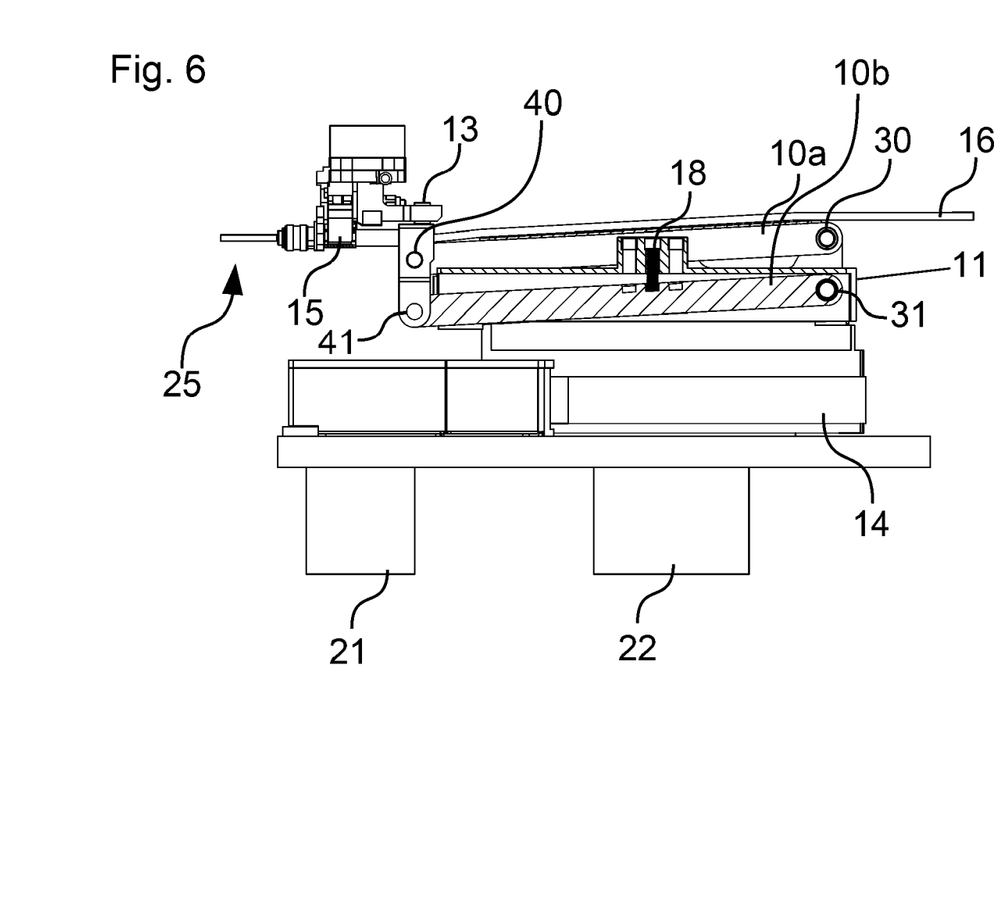
FIG. 6 is a sectional view of the part of the cable end holding device of FIG. 5 along the line VI-VI.
Figure 7A:
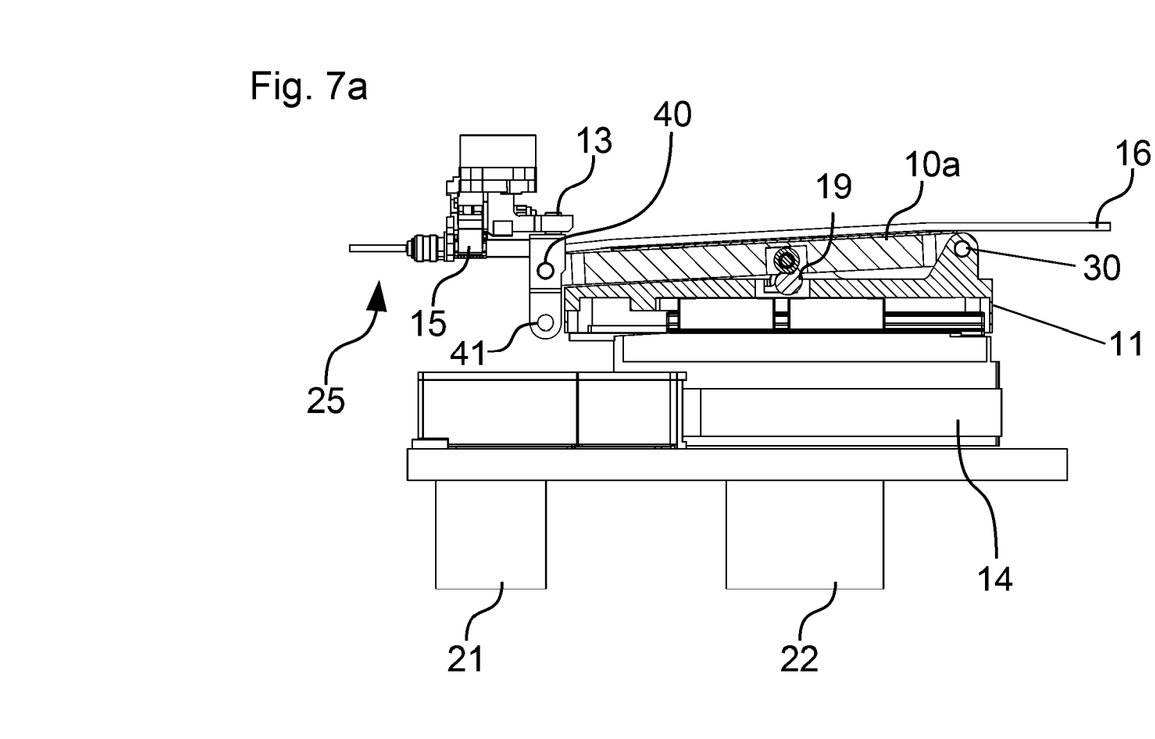
FIG. 7a is a sectional view of the part of the cable end holding device of FIG. 5 along the line VIIa-VIIa.
Figure 7B:
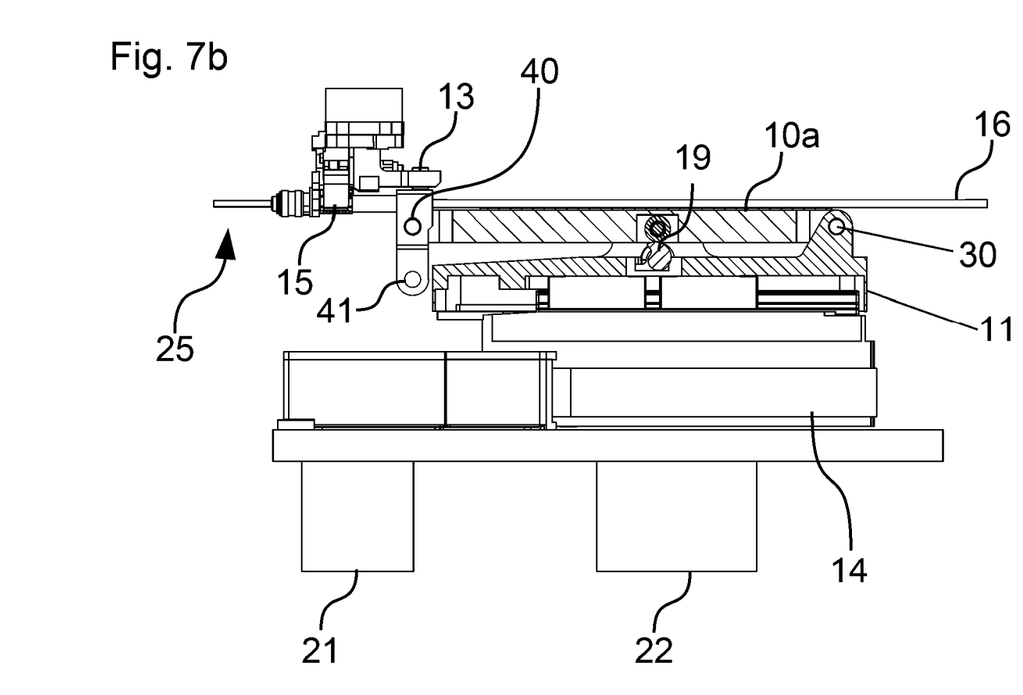
FIG. 7b is a sectional view of the part of the cable end holding device of FIG. 5 along the line VIIa-VIIa, the lever elements being oriented substantially horizontally.

FIG. 5 is a plan view of part of the cable end holding device 1 of FIGS. 1-3. FIG. 6 is a sectional view of the part of the cable end holding device 1 of FIG. 5 along the line VI-VI. FIG. 7a is a sectional view of the part of the cable end holding device 1 of FIG. 5 along the line VIIa-VIIa. FIG. 7b is a sectional view of the part of the cable end holding device 1 of FIG. 5 along the line VIIa-VIIa, the lever elements 10a, 10b being oriented substantially horizontally.

The cable end holding device 1 comprises a longitudinal position alteration device 11. The longitudinal position alteration device 11 moves the upper part in FIG. 7b of the cable end holding device 1 comprising the lever elements 10a, 10b and the cable holding element 15 or pivot arm 2 right and left, in other words along the longitudinal direction of the lever elements 10a, 10b, if these are oriented horizontally (although this does not mean that movement of this type is only possible when the lever elements 10a, 10b are horizontally oriented).

Since when the vertical position of the gripper or cable holding element 15 is altered the longitudinal position of the gripper or cable holding element 15 and thus of the cable end 25 changes (without corresponding compensation), the upper part of the cable end holding device 1 is moved correspondingly along the longitudinal direction (left and right in FIG. 7b) so as to compensate this change in the longitudinal position. As a result, the cable end 25 can be moved in such a way that the longitudinal position of the cable end 25 is substantially not altered, but rather only the vertical position of the cable end 25. This means that the movement of the cable end 25, which describes an arc as a result of rotation of the lever elements 10a, 10b about the first axes of rotation 30, 31 thereof, is compensated by the longitudinal position alteration device 11, in such a way that a pure upward or downward movement (Z direction) is achieved. The longitudinal position of the cable end 25 or cable tip may be set to a few hundredths of a millimeter, as is required for example in processing aluminum cables.

The cable holding element 15 comprises a vertical position setting device 13. The vertical position setting device 13 allows fine-tuning of the vertical position of the cable end 25 in the Z direction. As a result, the lever elements 10a, 10b, in other words the longitudinal sides of the parallelogram, can always be oriented horizontally for the stripping, in such a way that the occurring forces during stripping can be absorbed particularly well by the parallelogram or the lever elements 10a, 10b, since the occurring forces act along the lever elements 10a, 10b.

By means of the vertical position setting device 13, which serves as a fine-tuning device, the height of the cable end 25 can be particularly finely set or altered.

Individual positions in which the cable end 25 has to be arranged for different processing stations or tools may be stored (for example in an EEPROM, on a hard disk and/or in the cloud) and retrieved again. Thus, when a tool is changed, the user can load or input the corresponding position (in the vertical direction and/or in the longitudinal direction and/or in the width direction) and/or the corresponding angle of rotation. Thus, the processing stations or tools do not have to be set in height, since the cable end holding device 1 correspondingly alters or adapts the position of the cable end 25.

The longitudinal position alteration device 11 has a motor 22 for changing the longitudinal position of the cable holding element 15.

FIG. 7b is a view along the same sectional plane as FIG. 7a. In FIG. 7a, the lever elements 10a, 10b, or more precisely the longitudinal directions of the lever elements 10a, 10b, are at a non-zero angle to the horizontal, the left end of the lever elements 10a, 10b being positioned lower than the right end of the lever elements 10a, 10b in FIG. 7a. In other words, the lower second axis of rotation 41 is located lower than the lower first axis of rotation 31 (FIG. 6), and the upper second axis of rotation 40 is positioned lower than the upper first axis of rotation 30. In FIG. 7b, the longitudinal directions of the lever elements 10a, 10b extend horizontally. In FIG. 7b, the upper first axis of rotation 30 is located at the same height as the upper second axis of rotation 40, and in FIG. 7b, the lower first axis of rotation 31 (FIG. 6) is located at the same height as the lower second axis of rotation 41. The cable end 25 extends horizontally both in FIG. 7a and in FIG. 7b.

Figures 8, 9, 12:
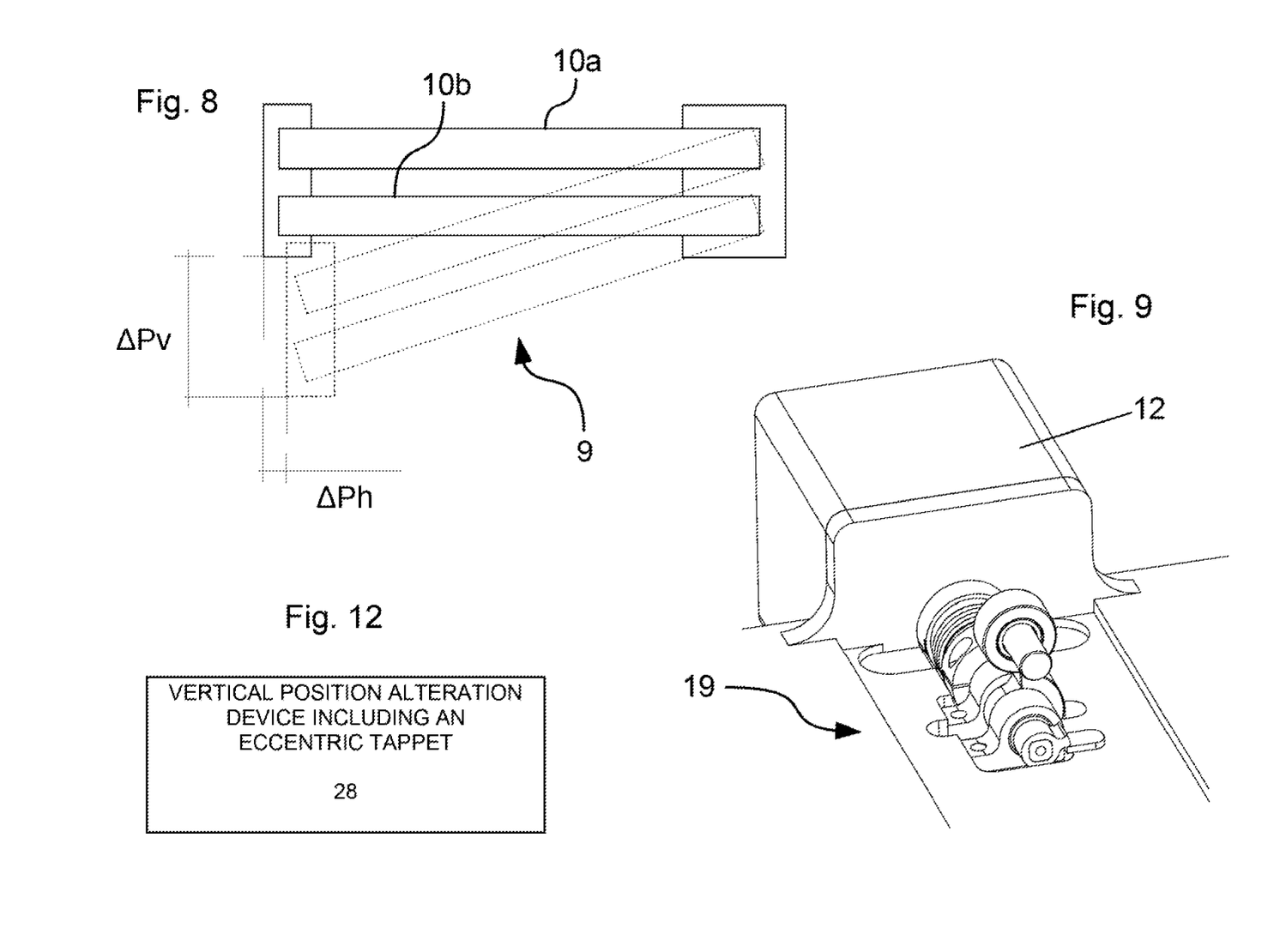
FIG. 8 is a schematic view of the alteration of the vertical position in two different orientations of the lever elements.
FIG. 9 is a perspective detail of an arithmetic spiral of the cable end holding device of FIGS. 1-3.
FIG. 12 schematically depicts a feature of a further embodiment.

FIG. 8 is a schematic view of the alteration of the vertical position in two different orientations of the lever elements 10a, 10b. FIG. 9 is a perspective detail of an arithmetic spiral 19 of the cable end holding device 1 of FIGS. 1-3.

FIG. 8 shows the parallelogram guide 9. In FIG. 8, it can be seen that a rotation of the lever elements 10a, 10b about the first axes of rotation 30, 31 thereof, which leads to a change in height of the cable holding element 15 of ΔPv, leads to an alteration to the position of the cable holding element 15 by a length of ΔPh. This alteration to the longitudinal position of the cable holding element 15 can be compensated by the longitudinal position alteration device 11, in such a way that only a change in height in the position of the cable holding element 15 takes place.

The angle of the lever elements 10a, 10b to the horizontal (which extends from left to right in FIG. 7a and FIG. 7b) can be altered using a cam disk, in particular an arithmetic or Archimedean spiral 19. As a result, the lever elements 10a, 10b can be rotated about the first axes of rotation 30, 31 thereof in a technically simple manner.

The cam disk can be driven using a stepper motor 12. Alternatively, an eccentric tappet 28 (schematically depicted in FIG. 12) is also conceivable. A spring element 18 (FIG. 6) pushes one of the lever elements 10a, 10b, specifically the upper lever element 10a, against the cam disk, in such a way that the contact between this lever element 10a and the cam disk always remains preserved.

Alternatively, or in addition, an alteration to the angle of the lever elements 10a, 10b to the horizontal or rotation of the lever elements 10a, 10b about the first axes of rotation 30, 31 thereof using a motor-driven spindle, a linear motor and/or a controllable pneumatic cylinder is conceivable.

Thus, for example a motor-driven spindle can push and pull one of the lever elements 10a, 10b upward and downward. As a result, the lever elements 10a, 10b each rotate about the first axis of rotation 30, 31 thereof and alter the angle thereof to the horizontal. As a result, the vertical position of the second axes of rotation 40, 41 can be adjusted by way of the motor-driven spindle.

A linear motor may be arranged in such a way that it pushes/pulls the lever elements 10a, 10b upward and downward in such a way that the lever elements 10a, 10b rotate about the first axis of rotation 30, 31 thereof and alter the angle thereof to the horizontal.

The lever elements 10a, 10b can also be rotated about the first axes of rotation 30, 31 thereof, and the angles of the lever elements 10a, 10b to the horizontal altered, using a controllable pneumatic cylinder.

After the cable end 25 is connected to the contact element 26, the length of the cable is shortened to the desired length using the blade 23. Subsequently, the process can be continued on the other side of the blade 23 analogously to the previously described process. This means that the contact element 26 is guided by the blade 23 or the opening in the blade 23, and the cable is grasped on the other side by a further gripper or cable holding element 15. The cable is now cut. Subsequently, the free cable end of the cable, one cable end 25 of which is already connected to a contact element 26, can likewise be connected to a contact element 26, in particular in the manner described above.

The lever elements 10a, 10b are always rotated through the same angles about the respective first axes of rotation 30, 31 thereof, in such a way that the lever elements 10a, 10b are always oriented mutually parallel.

As a result, a cable assembly machine is also described, which comprises a or the described cable end holding device and a or the described blade.

The lever elements may be of the same length.

The first axes of rotation of the two lever elements are located at the same position in the longitudinal direction, which extends from left to right in FIG. 8.

It is also conceivable that the cable feed 3 is mounted on the pivot arm 2.

Finally, it should be noted that terms such as "having", "comprising" etc. do not exclude the possibility of other elements or steps and terms such as "a" or "one" do not exclude a plurality. Further, it should be noted that features or steps that have been described with reference to one of the above embodiments may also be used in combination with other features or steps of other above-described embodiments.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE NUMERALS

1, 1' Cable end holding device
2, 2' Pivot arm
3, 3' Cable feed
4' Blade block
5, 5' Press
6', 6" Additional station
7' Plunger
8' Height adjustment system
9 Parallelogram guide
10a, 10b Lever elements
11 Longitudinal position alteration device
12 Stepper motor for Z direction
13 Vertical position setting device
14 Rotation device
15 Cable holding element
16 Guide tube
17 Plate on the upper lever
18 Spring element
19 Arithmetic spiral
20 Cable axis
21 Motor for rotational movement
22 Motor for horizontal displacement
23 Blade
24, 24' Stamp
25 Cable end
26, 26' Contact element
27, 27' Anvil
30, 31 First axes of rotation
40, 41 Second axes of rotation
ΔPh Horizontal change in position
ΔPv Vertical change in position
Z Z direction

What is claimed is:

1. A cable end crimping station comprising:
   a press for performing a crimp process on a cable end of a cable; and
   a cable end holding device for holding the cable end during the crimp process, the cable end holding device comprising:
      a cable holding element for holding the cable end; and
      a vertical position alteration device having two lever elements for altering, independent of a movement of a stamp of the press during the crimp process, a vertical position of the cable holding element in a vertical direction;

wherein the lever elements extend mutually parallel along a longitudinal direction of the lever elements, the lever elements being arranged mutually offset in height and in a width direction perpendicular to the vertical direction and perpendicular to the longitudinal direction; and wherein the lever elements are each rotatably mounted about a respective first axis of rotation extending along the width direction, the two first axes of rotation extending mutually parallel.

2. The crimping station according to claim 1 wherein the cable holding device includes a longitudinal position alteration device for changing a position of the cable holding element along a direction perpendicular to the vertical direction.

3. The crimping station according to claim 1 wherein the cable end holding device includes a rotation device for rotating the cable holding element and the lever elements about an axis of rotation extending in the vertical direction.

4. The crimping station according to claim 1 wherein the vertical position alteration device includes a curved disk for changing the vertical position of the cable holding element.

5. The crimping station according to claim 4 wherein the curved disk is formed as at least one of an arithmetic spiral and an eccentric tappet.

6. The crimping station according to claim 1 wherein the cable end holding device includes a vertical position setter device for altering the vertical position of the cable end.

7. A cable assembly machine comprising:
the crimping station according to claim 1; and
a blade for cutting the cable.

8. A cable end holding device for holding a cable end of a cable for a crimp process, the cable end holding device comprising:
a cable holding element for holding the cable end;
a vertical position alteration device having: (i) two lever elements for altering a vertical position of the cable holding element in a vertical direction independent of a movement of a stamp during the crimp process, and (ii) a rotary cam disk against which one of the lever elements is pressed, which rotary cam disk changes the vertical position of the cable holding element;
wherein the lever elements extend mutually parallel along a longitudinal direction of the lever elements, the lever elements being arranged mutually offset in height and in a width direction perpendicular to the vertical direction and perpendicular to the longitudinal direction; and
wherein the lever elements are each rotatably mounted about a respective first axis of rotation extending along the width direction, the two first axes of rotation extending mutually parallel.

9. The cable holding device according to claim 8 including a longitudinal position alteration device for changing a position of the cable holding element along a direction perpendicular to the vertical direction.

10. The cable end holding device according to claim 8 including a rotation device for rotating the cable holding element and the lever elements about an axis of rotation extending in the vertical direction.

11. The cable end holding device according to claim 8 wherein the rotary cam disk is a curved disk for changing the vertical position of the cable holding element.

12. The cable end holding device according to claim 11 wherein the curved disk is formed as at least one of an arithmetic spiral and an eccentric tappet.

13. The cable end holding device according to claim 8 including a vertical position setter device for altering the vertical position of the cable end.

14. A cable assembly machine comprising:
the cable end holding device according to claim 8; and
a blade for cutting the cable.

15. A cable end processing machine for processing a cable end of a cable, the cable end processing machine comprising:
a stamp for crimping a contact element to the cable end; and
a cable end holding device for holding the cable end of the cable during the crimping, the cable end holding device comprising:
a cable holding element for holding the cable end;
a vertical position alteration device having two lever elements for altering, independent of a movement of the stamp during the crimping, a vertical position of the cable holding element in a vertical direction;
wherein the lever elements extend mutually parallel along a longitudinal direction of the lever elements, the lever elements being arranged mutually offset in height and in a width direction perpendicular to the vertical direction and perpendicular to the longitudinal direction; and
wherein the lever elements are each rotatably mounted about a respective first axis of rotation extending along the width direction, the two first axes of rotation extending mutually parallel.

* * * * *